(12) United States Patent
Basov

(10) Patent No.: US 10,346,360 B1
(45) Date of Patent: Jul. 9, 2019

(54) MANAGING PREFETCHING OF DATA IN STORAGE SYSTEMS

(71) Applicant: EMC Corporation, Hopkinton, MA (US)

(72) Inventor: Ivan Basov, Brookline, MA (US)

(73) Assignee: EMP IP Holding Company LLC, Hopkinton, MA (US)

( * ) Notice: Subject to any disclaimer, the term of this patent is extended or adjusted under 35 U.S.C. 154(b) by 309 days.

(21) Appl. No.: 14/870,462

(22) Filed: Sep. 30, 2015

(51) Int. Cl.
*G06F 16/00* (2019.01)
*G06F 16/172* (2019.01)
*G06F 3/06* (2006.01)
*G06F 12/0862* (2016.01)
*G06F 16/182* (2019.01)

(52) U.S. Cl.
CPC ............ *G06F 16/172* (2019.01); *G06F 3/064* (2013.01); *G06F 3/0611* (2013.01); *G06F 3/0643* (2013.01); *G06F 3/0689* (2013.01); *G06F 12/0862* (2013.01); *G06F 16/182* (2019.01); *G06F 2212/1024* (2013.01); *G06F 2212/154* (2013.01); *G06F 2212/463* (2013.01); *G06F 2212/602* (2013.01)

(58) Field of Classification Search
None
See application file for complete search history.

(56) References Cited

U.S. PATENT DOCUMENTS

| | | | | |
|---|---|---|---|---|
| 7,386,674 B1* | 6/2008 | Lango | ................. | G06F 3/061 707/999.202 |
| 2003/0225977 A1* | 12/2003 | Desai | ................. | G06F 3/0601 711/137 |
| 2005/0144394 A1* | 6/2005 | Komarla | ............. | G06F 12/0862 711/137 |
| 2009/0030956 A1* | 1/2009 | Zhang | ................. | G06F 12/0223 |
| 2016/0378668 A1* | 12/2016 | Roberts | ............... | G06F 12/0862 711/137 |
| 2017/0031823 A1* | 2/2017 | Ross | ................. | G06F 12/0862 |

* cited by examiner

*Primary Examiner* — Son T Hoang
(74) *Attorney, Agent, or Firm* — Krishnendu Gupta; Deepika Bhayana

(57) ABSTRACT

A data access pattern is determined by a file system mapping component for prefetching data for performing I/O requests on the data. Information associated with determination of the data access pattern is provided by the file system mapping component to a block mapping component. Based on the information, prefetching of data is managed by the block mapping component from a storage device for performing the I/O requests.

18 Claims, 9 Drawing Sheets

MANAGING PREFETCHING OF DATA IN STORAGE SYSTEMS

BACKGROUND

Technical Field

This application relates to managing prefetching of data in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

Additionally, the need for high performance, high capacity information technology systems are driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

File-based data storage systems include programming and hardware structures to provide file-based access to file systems. File-based data storage systems are sometimes referred to as Network Attached Storage or NAS systems. Such systems may support NFS (Network File System), CIFS (Common Internet File System), SMB (Server Message Block), and/or other file-based protocols. With file-based protocols, host computers (hosts) perform read and write operations to files by specifying particular file systems, paths, and file names. Internally to the data storage system, file system directories map the files specified by host commands to particular sets of blocks on internal volumes, which themselves are derived from disk drives or electronic flash drives. The data storage system accesses the mapped locations and performs the requested reads or writes. An example of a file-based data storage system is the Celerra® system and VNX® system from EMC Corporation of Hopkinton, Mass.

Data storage systems may utilize a file-based representation of block-oriented storage objects that are exposed to external users, such as host computers accessing the data storage system via a network. For example, a logical unit of storage or LUN is a block-oriented storage object visible as a block-oriented storage device to a host computer. Internally, however, the storage system may map the LUN into a file of an internal file system, and then manage access and other aspects of the LUN by corresponding operations on the mapped file. This organization can help enhance efficiency of processing storage operations. Additionally, in current systems employing virtual computing technology, units of virtualized storage for virtual machines may be represented as files of a distributed file system used by a host computer and one or more network-attached storage (NAS) systems. Within a host, accessing a virtualized storage unit requires a mapping to a file of the distributed file system, and within the storage system the file is mapped to underlying physical storage that contains the data of the virtualized storage unit. This mapping may be a multi-level mapping that may include use of a separate internal file system. Both the distributed file system and the internal file system may be described as "hosting" the virtualized storage units.

Data storage systems are arrangements of hardware and software that include storage processors coupled to arrays of non-volatile storage devices. In typical operation, storage processors service storage requests that arrive from client machines. The storage requests specify files or other data elements to be written, read, created, or deleted, for example. The storage processors run software that manages incoming storage requests and performs various data processing tasks to organize and perform I/O operations on the data stored on the non-volatile storage devices.

Computer systems store data to be accessed both locally and through a network but they are also capable of performing a wide variety of data protection technologies. Data protection technologies can include, for example, backups, mirroring, snapshots, etc. Providing local and network access to data blocks or data files along with employing a myriad of data protection technologies often correlates to a competition for computer system resources. For example, most storage devices are limited in the amount of reads and writes that can take place during any given time period. If after every write to a storage device, a second write is made to backup device, a third write is made to a mirror, and a fourth write is made to a snapshot storage device, performance of the system during these consecutive or parallel read/writes may suffer.

One way to increase performance and decrease competition for resources is to avoid unnecessary reads or writes by cataloging and/or indexing more information related to the storage and access of data. For example, when a processor of the computer system receives an instruction to read a data block of a particular storage volume, the processor allocates memory and then reads the data block of the storage volume from disk into the allocated memory.

It is understood that data blocks already residing in a cache can be read and used in reading and/or writing the data blocks without performing a disk I/O. This can increase the efficiency of data access operations by reducing disk I/O. However, one limitation is that data blocks necessary to perform data access operations may not always reside in a cache. Thus, there exists a need to identify data blocks that are necessary to perform data access operations and place them in a cache, for later or concurrent access by the data access operations, without increasing disk I/O.

SUMMARY OF THE INVENTION

A method is used in managing prefetching of data in storage systems. A data access pattern is determined by a file system mapping component for prefetching data for performing I/O requests on the data. Information associated with determination of the data access pattern is provided by the file system mapping component to a block mapping component. Based on the information, prefetching of data is managed by the block mapping component from a storage device for performing the I/O requests.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
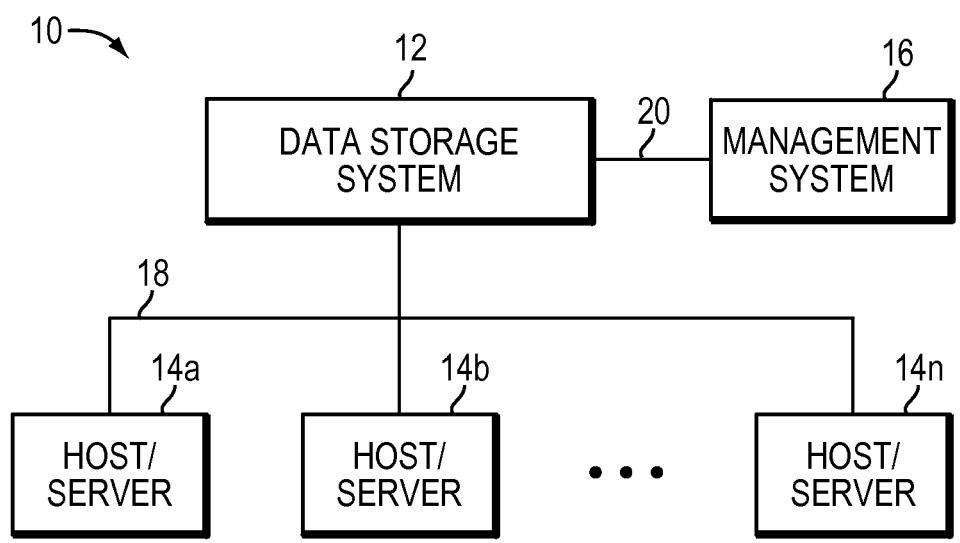
FIGS. 1-3 are examples of an embodiment of a computer system that may utilize the techniques described herein.

Described below is a technique for use in managing prefetching of data in storage systems, which technique may be used to provide, among other things, determining, by a file system mapping component, a data access pattern for prefetching data for performing I/O requests on the data, providing, by the file system mapping component, information associated with determination of the data access pattern to a block mapping component, and based on the information, managing, by the block mapping component, prefetching of data from a storage device for performing the I/O requests.

Generally, a storage pool is a collection of storage that is provisioned for a logical unit. A storage pool may be a collection of disks, which may include disks of different types. Storage pools may further be subdivided into slices; for example, a 1 gigabyte (GB) slice may be the allocation element for a logical unit. Further, a slice may be 256 megabytes (MB) in size. A slice may be considered the smallest element that can be tracked and moved. A storage pool may be a collection of storage containers. A storage container may be a unit of storage including a set of storage extents. A storage extent is a logical contiguous area of storage reserved for a user requesting the storage space.

A disk may be a physical disk within the storage system. A LUN may be a logical unit number which is an identifier for a Logical Unit. Each slice of data may have a mapping to the location of the physical drive where it starts and ends.

Further, a pool of storage devices may be organized into multiple RAID groups, and each RAID group may further divided be into a number of LUs from which slices are allocated to one or more mapped LUs for use by users of a storage array. As used herein, a mapped LU refers to a logical portion of storage space that represent contiguous and/or non-contiguous physical storage space, where mapping allows for physical storage space to be dynamically linked together at a time of use into a logically contiguous address space. Exemplary examples of mapped LUs may include thin logical units (TLUs) and direct logical units (DLUs). A thin logical unit ("TLU") is a sparsely populated logical unit (LU) provisioned at creation but which is not allocated any storage until the storage is actually needed. A "direct logical unit" or "DLU" (also referred to as "direct mapped LUN") is a fully provisioned mapped LU with coarse mapping. Even though a DLU is seen as fully provisioned by a user, internally storage space is allocated on as needed basis. TLUs may have a logical size that is larger than the actual storage size consumed by the TLUs. The actual consumed size is determined by the number of slices actually allocated to a TLU. Thus, an amount of storage space presented to a host of a data storage system using a thin logical volume may be different than the amount of storage space actually allocated to the thin logical volume. The slices that are allocated to a mapped LUN may be physically located anywhere in a storage array.

File system mapping logic (also referred to herein a file mapping component") in a storage system presents a volume organized on a storage device as a file system to a host and provides a thin provisioning service by adding fixed sized slices to a file system when the file system needs storage space to write data. Thus, as described above herein, virtual address space of a file system may be apportioned into fixed sized sections or chunks, each chunk being a slice. Thus, as described above herein, virtual address space of a file system may be apportioned into fixed sized sections or chunks, each chunk being a slice. A file system may dynamically add or remove slices based on the amount of space consumed by the file system. Further, a file system manages mapping information for mapping its virtual address space with physical location of slices on a storage device.

File systems typically include metadata describing attributes of a file system and data from a user of the file system. A file system contains a range of file system blocks that store metadata and data. A user of a file system access the file system using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). However, it should be noted that a file system may be organized based on any one of the known mapping techniques such as an extent based binary tree mapping mechanism.

Generally, each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block.

A data storage system may include file mapping and block mapping components that may provide file and block services to clients. Generally, both file and block mapping components include adaptive data prefetch techniques (also referred to herein as "predictive prefetch techniques") for predicting access patterns for reading data from a storage device. Generally, an adaptive data prefetch technique includes at least two features. First, the adaptive data prefetch technique predicts which data blocks have a high probability of being accessed for an I/O operation (e.g., read) based on data access pattern of a client sending I/O requests to a storage system. Second, the adaptive data prefetch technique determines which of the data blocks identified in the first step indicated above herein are required to be read into a cache from a storage device. For example, data blocks that are residing in a cache of a storage system are not required to be perfected from a storage device and are accessed from the cache. One of the data access patterns that may be identified by an adaptive data prefetching technique is a sequential data access pattern in which data blocks that are accessed are organized in a sequential manner. However, data which is organized in a sequential manner in a file system accessed by a file mapping component may either be organized in a non-sequential or random manner in a volume accessed by a block mapping component.

Conventionally, respective adaptive data prefetch techniques used by file mapping and block mapping components do not interact or provide information to each other thereby creating a situation in which the block mapping component is unable to identify a data access pattern that has been identified by the file mapping component. In such a conventional system, when a sequential data access pattern is identified by a file mapping component, data blocks associated with the sequential data access pattern may not be organized in a sequential manner on a volume accessed by a block mapping component for prefetching the data blocks thereby making it difficult or impossible for the block mapping component to identify the sequential data access pattern that has been identified by the file mapping component. Conventionally, a block mapping component may attempt to improve prefetching data that has a high probability of being accessed in future either by improving data block placement and/or data blocks allocation techniques or by letting a file mapping component perform prefetching of data. However, in such a conventional system, improving data block placement and/or data blocks allocation techniques may not result into efficient prefetching of data required by data access operations upon receiving multiple simultaneous write operations for either the same file or different files. Similarly, in such a conventional system, having a file mapping component perform prefetching of data may not efficiently prefetch data because the data may not be cached by a block mapping component.

By contrast, in at least some implementations in accordance with the technique as described herein, a file mapping component in the current technique provides information regarding a data access pattern (such as sequential access pattern) identified by the file mapping component to a block mapping component for prefetching data. In at least one embodiment of the current technique, the file mapping component may either provide a list of data blocks or a list of mappings of the data blocks to the block mapping component for prefetching the data blocks upon detecting a data access pattern such that the block mapping component may use the list of data blocks or mappings of the data blocks to identify the data access pattern by using information regarding the data blocks in conjunction with adaptive data prefetch techniques used by the block mapping component. Thus, the file mapping and block mapping components provide information to each other to identify data access pattern for improving data read performance irrespective of how data blocks are organized or allocated on a storage device during write I/O operations.

In at least some implementations in accordance with the current technique as described herein, the use of the managing prefetching of data in storage systems technique can provide one or more of the following advantages: improving efficiency of a data storage system by efficiently processing read operations on data stored on a storage device, improving performance of I/O operations by determining which data blocks have a high probability of being accessed in future and prefetching such data blocks, and reducing the number of I/O operations required for reading data from a storage device by caching the data in the storage system.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
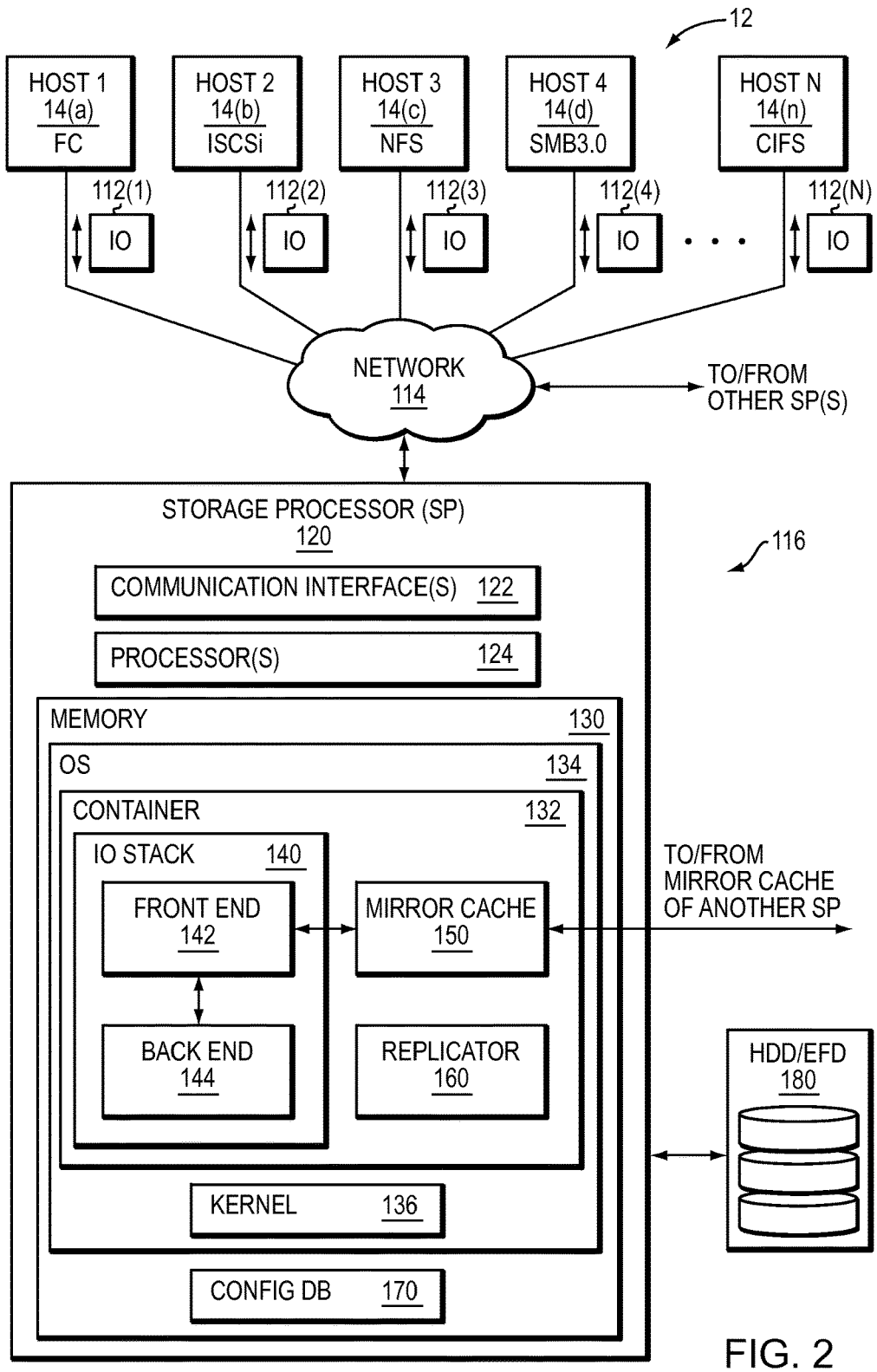

Generally, designs of block-based and file-based data storage systems often follow parallel paths. Further, many of the features provided by block-based storage, such as replication, snaps, de-duplication, migration, failover, and non-disruptive upgrade, are similar to features provided for file-based data storage systems. For user convenience, block-based and file-based storage systems are sometimes co-located, essentially side-by-side, to allow processing of both block-based and file-based host IOs in a single combined system as illustrated in FIG. 2. Alternatively, both block-based and file-based functionality may be combined in a unified data path architecture. The unified data path architecture brings together IO processing of block-based storage systems and file-based storage systems by expressing both block-based objects and file-based objects in the form of files. These files are parts of an underlying, internal set of file systems, which is stored on a set of storage units served by a storage pool. Because both block-based objects and file-based objects are expressed as files, a common set of services can be applied across block-based and file-based objects for numerous operations, such as replication, snaps, de-duplication, migration, failover, non-disruptive upgrade, and/or many other services, as these services are performed similarly for both block and file objects on the same underlying type of object—a file. Further, the unified data path architecture increases storage utilization by reallocating storage resources once allocated to block-based storage to file-based storage, and vice-versa. As block-based objects (e.g., LUNs, block-based vVols, and so forth) and file-based objects (e.g., file systems, file-based vVols, VMDKs, VHDs, and so forth) are expressed as underlying files, storage units released by any underlying file or files can be reused by any other underlying file or files, regardless of whether the files represent block-based objects or file-based objects. Additional details regarding the unified data path architecture is described in U.S. patent application Ser. No. 13/828,322 for "Unified DataPath Architecture", filed Mar. 14, 2013, the contents and teachings of which are hereby incorporated by reference in their entirety.

In at least one embodiment of the current technique, the unified data path architecture requires a file system to be hosted on a mapped LUN as a file system on a file.

Referring now to FIG. 2, shown is an example of an embodiment of a computer system that may be used in connection with performing the technique or techniques described herein.

FIG. 2 shows an example environment 12 in which embodiments of the improved technique hereof can be practiced. Here, multiple host computing devices ("hosts"), shown as devices 14(a) through 14(n), access a data storage apparatus 116 over a network 114. The data storage apparatus 116 includes a storage processor, or "SP," 120 and storage 180. The storage 180 is provided, for example, in the form of hard disk drives (HDD) and/or electronic flash drives (EFD). Although not shown in FIG. 2, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 14(1-N) connect to the SP 120 using various technologies. For example, the host 14(1) can connect to the SP 120 using Fibre Channel (e.g., through a SAN). The hosts 14(2-N) can connect to the SP 120 using TCP/IP, to support, for example, iSCSI, NFS, SMB 3.0, and CIFS. Any number of hosts 14(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processors 124, and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 further includes a container 132. In an example, the container 132 is a software process that provides an isolated user space execution context within the operating system 134. In various examples, the memory 130 may include multiple containers like the container 132, with each container providing its own isolated user space instance. Although containers provide isolated environments that do not directly interact (and thus promote fault containment), different containers can run on the same kernel 136 and can communicate with one another using inter-process communication (IPC) mediated by the kernel 136. Containers are well-known features of Unix, Linux, and other operating systems.

In the example of FIG. 2, only a single container 132 is shown. Running within the container 132 is an IO stack 140, a mirror cache 150, and a replicator 160. The IO stack 140 provides an execution path for host IOs (e.g., 112(1-N)) and includes a front end 142 and a back end 144. The mirror cache 150 stores data for incoming writes and mirrors the data to cache on another SP. The replicator 160 makes local and/or remote copies of data for incoming writes. As the IO stack 140, mirror cache 150, and replicator 160 all run within the same container 132, the IO stack 140, mirror cache 150, and replicator 160 can communicate with one another using APIs (application program interfaces), i.e., without the need to use IPC.

The memory 130 also stores a configuration database 170. The configuration database 170 stores system configuration information. In other implementations, the configuration database 170 is stored elsewhere in the data storage apparatus 116, such as on a disk drive separate from the SP 120 but accessible to the SP 120, e.g., over a backplane or network.

In operation, the hosts 14(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing. At the front end 142, processing may include caching data provided with any write IO requests to the mirror cache 150, which may in turn cache the data to another SP. Also within the front end 142, mapping operations map LUNs and host file systems to underlying files stored in a set of internal file systems of the front end 142. Host IO requests received for reading and writing both LUNs and file systems are thus converted to reads and writes of respective files. The IO requests then propagate to the back end 144, where commands are executed for reading and/or writing the physical storage 180, agnostically to whether the data read and/or written is directed to a LUN or to a host file system.

Although FIG. 2 shows the front end 142 and the back end 144 together in an "integrated" form, the front end 142 and back end 144 may alternatively be provided on separate SPs. For example, the IO stack 140 may be implemented in a "modular" arrangement, with the front end 142 on one SP and the back end 144 on another SP. The IO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends.

Figure 3:
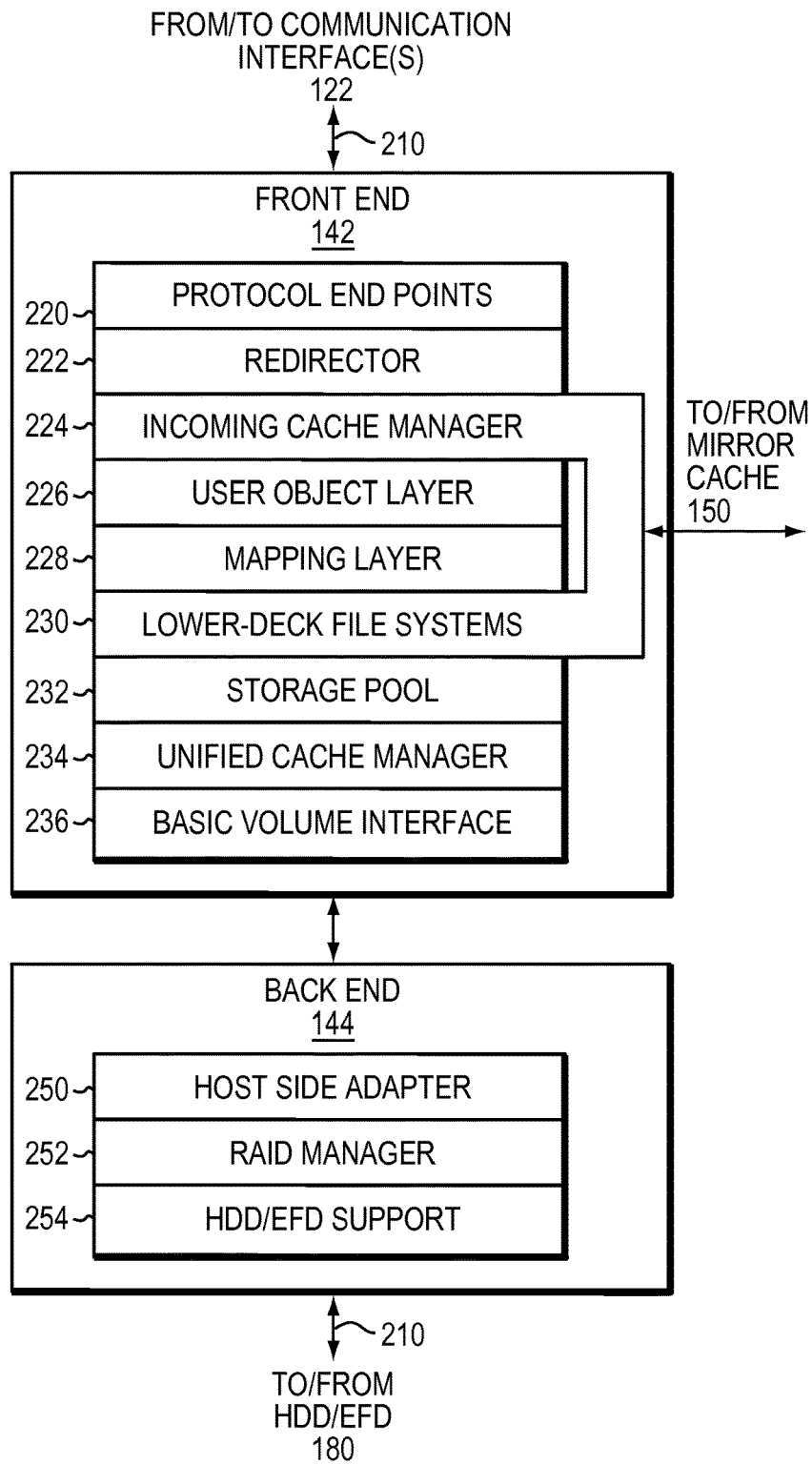

FIG. 3 shows the front end 142 and back end 144 of the IO stack 140 in additional detail. Here, the front end 142 is seen to include protocol end points 220, a redirector 222, an incoming cache manager 224, a user object layer 226, a mapping layer 228, one or more lower-deck (internal) file systems 230, a storage pool 232, a unified cache manager 234, and a basic volume interface 236. The back end 144 is seen to include a host side adapter 250, a RAID (Redundant Array of Independent Disks) manager 252, and hard disk drive/electronic flash drive support 254.

Within the front end 142, protocol end points 220 receive the host IO requests 210 from the communication interfaces 122 and perform protocol-specific processing, such as stripping off header information and identifying data payloads. Processing then continues to the redirector 222.

The redirector 222 receives the host IOs and, under specified conditions, redirects the host IO requests to another SP. For example, the LUN specified in any block-based host IO request may be owned by a particular SP of the data storage apparatus 116. If the SP 120 receives a host IO request that is directed to a LUN owned by another SP, the redirector 222 sends the host IO to the SP that owns the LUN, at which point processing of the host IO request by the SP 120 ceases. However, if the redirector 222 detects that the LUN specified in a block-based host IO request is owned by the SP 120, the redirector allows the host IO request to continue to propagate through the front end 142. The redirector 222 performs no operation for file-based host IO requests. For host IO requests that are not redirected, processing continues to the incoming cache manager 224.

The incoming cache manager 224 provides low-latency responses to incoming host IO write requests. When a write IO request is received, the incoming cache manager 224 caches the data specified by the write request in the mirror cache 150. Operating in conjunction with the unified system cache 234, the incoming cache manager 224 directs the contents of the mirror cache 150 to be copied over a high-speed interconnect (e.g., a high-speed cable or bus) to a cache of a second SP of the data storage apparatus, where a duplicate copy of the data is stored. The data specified by the host write 10 request are thus stored in two independent locations and are deemed to be persisted. Upon confirmation that the data have been successfully written to both the mirror cache 150 and the cache of the other SP, the incoming cache manager 224 acknowledges the write back to the originating host (i.e., the host of 14(1-N) that sent the write host IO). Using this arrangement, write requests are acknowledged quickly, without the need to wait until the requests propagate to the actual storage 180 or even to the unified cache manager 234, thereby providing a low level of latency in responding to write IOs. The data stored in the mirror cache 150 may eventually be destaged to the storage 180 (e.g., to the set of slices that store the LUN or file system being written to), but such destaging may be conducted when convenient and out of band with the processing of host IOs. Processing continues to the incoming user object layer 226.

The user object layer 226 presents underlying files representing LUNs and underlying files representing host file systems in a form recognized by the hosts (i.e., as LUNs and host file systems). For example, the user object layer 226 presents data stored in underlying files for block-based data as LUNs. The user object layer 226 also presents data stored in underlying files for file-based data as host file systems. In an example, the user object layer 226 includes an upper-deck file system for each host file system stored in a file of the lower-deck file system(s) 230 (described below). Each upper-deck file system presents files and directories of a host file system to the hosts 14(1-N), even though the host file system is represented internally as a file.

The mapping layer 228 maps host objects as presented in the user object layer 226 to corresponding underlying files stored in one or more lower-deck file systems 230. For LUNs, the mapping layer 228 converts a LUN identifier and offset range to a particular file in a lower-deck file system 230 and to a particular offset range within that file. Any set of blocks of a LUN identified in a host IO request are thus mapped to a set of blocks in the underlying file that represents the LUN. Similarly, for host file systems, the mapping layer 228 converts a given file or directory represented in an upper-deck file system of the user object layer 226 to a particular file in a lower-deck file system 230 and to a particular location within the file.

The lower-deck file system layer 230 represents LUNs and host file systems in the form of files. Any number of lower-deck file systems 230 may be provided. In one arrangement, a single lower-deck file system 230 may be provided to include any number of LUNs and/or host file systems, as well as their snaps (i.e., point-in-time copies). In another arrangement, a different lower-deck file system is provided for each primary object to be stored, i.e., for each LUN and for each host file system. The lower-deck file system for any primary object may include a file storing the object itself, as well as files storing any snaps of the object. Each lower-deck file system 230 has an inode table, which provides a unique inode for each file stored in the lower-deck file system 230. The inode table of each lower-deck file system stores properties of each file in the respective lower-deck file system, such as ownership and block locations at which the file's data are stored. Lower-deck file systems are built upon storage elements managed by a storage pool 232.

The storage pool 232 organizes elements of the storage 180 in the form of slices. A "slice" is an increment of storage space, such as 256 MB in size, which is drawn from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed from the storage 180, dividing the RAID groups into FLUs (Flare LUNs), and further dividing the FLU's into slices.

The unified cache manager 234 provides caching services for data stored in the lower-deck file systems 230. In some examples, the unified cache manager 234 directs data specified by host writes to local RAM or flash memory and thus avoids the need to access the storage 180, which is typically more remote than the local RAM or flash memory and takes more time to access. In some examples, the unified cache manager 234 also directs data returned in response to read IO requests to be stored in local RAM or flash memory for fast access in the event that subsequent host IO requests require the same data. In some examples, the local RAM or flash memory may store the only valid copy of host data, with writes to the storage 180 being deferred and, in cases where host data needs to be stored only transiently, avoided altogether.

The basic volume interface 236 is arranged to send host IOs to the back end 144 when the back end 144 is provided on another SP of the data storage apparatus 116 or when the back end 144 is provided on a separate array. In an example, the basic volume interface 236 converts host IOs propagating out of the front end 142 to a block-based protocol, such as Fibre Channel. After being processed by the basic volume interface 236, processing continues to the back end 144. Within the back end 144, the host side adapter 250 receives the host IO and extracts the host IO content. In some implementations, such as the "integrated" arrangement shown in FIG. 2, the basic volume interface 236 and host side adapter 250 may be omitted or may be made to perform no operation.

The RAID manager 252 accesses the particular slice or slices being written or read using RAID protocols. In some examples, the RAID manager 252 also performs out-of-band operations of maintaining RAID groups, such as swapping out failing disk elements and applying erasure coding to restore required redundancy.

The hard disk drive/electronic flash drive support 254 includes drivers that perform the actual reading from or writing to the storage 180.

Although the above-described components of the IO stack 140 are presented in a particular order, this order can be varied. For example, the incoming cache manager 224 can be located above the redirector 222. Also, multiple cache managers can be provided at different locations within the IO stack 140.

Figure 4:
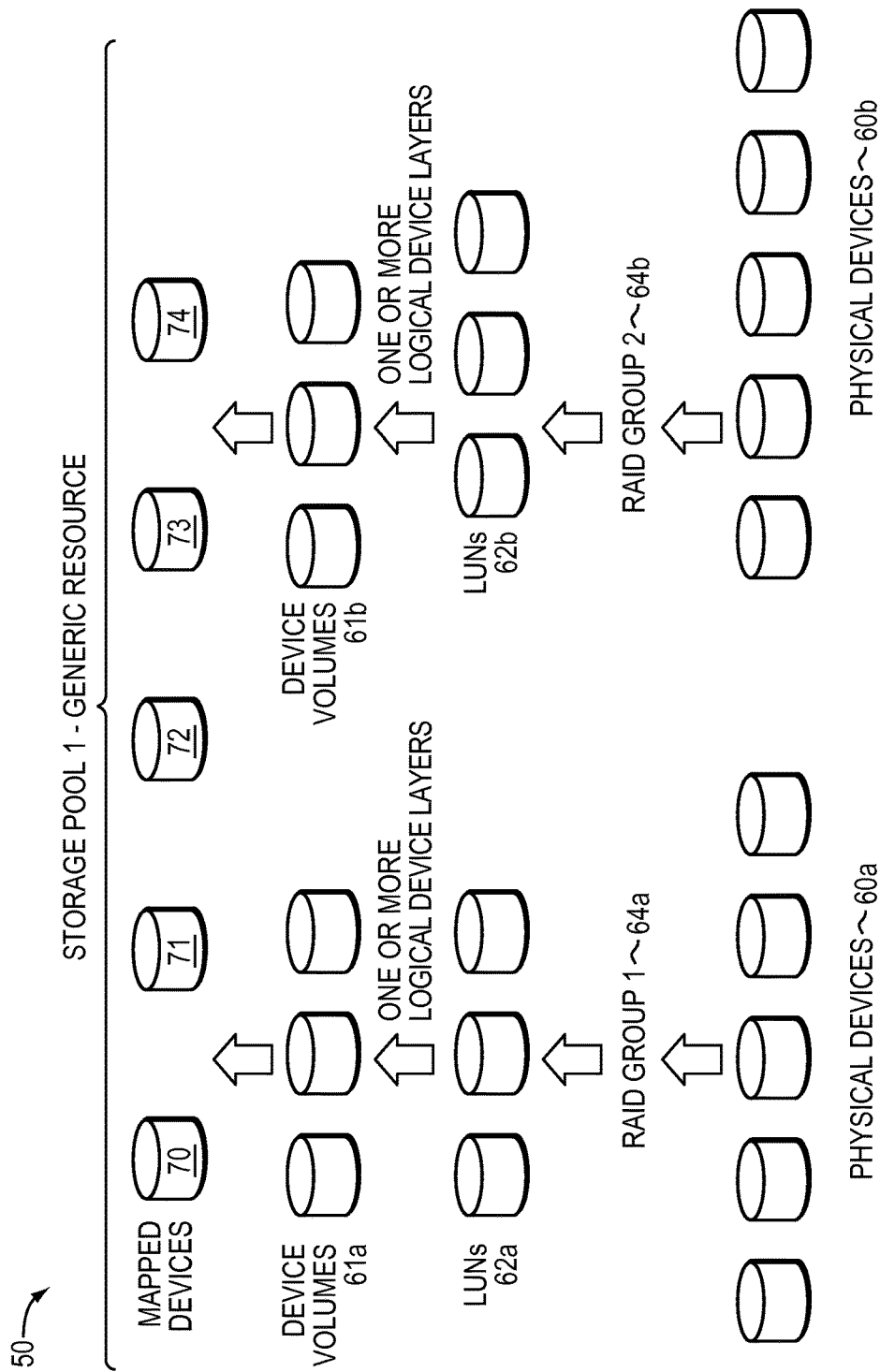
FIG. 4 is an example illustrating storage device layout.

Referring to FIG. 4, shown is an example representing how data storage system best practices may be used to form storage pools. The example 50 illustrates how storage pools may be constructed from groups of physical devices. For example, RAID Group 1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space.

Figure 5:
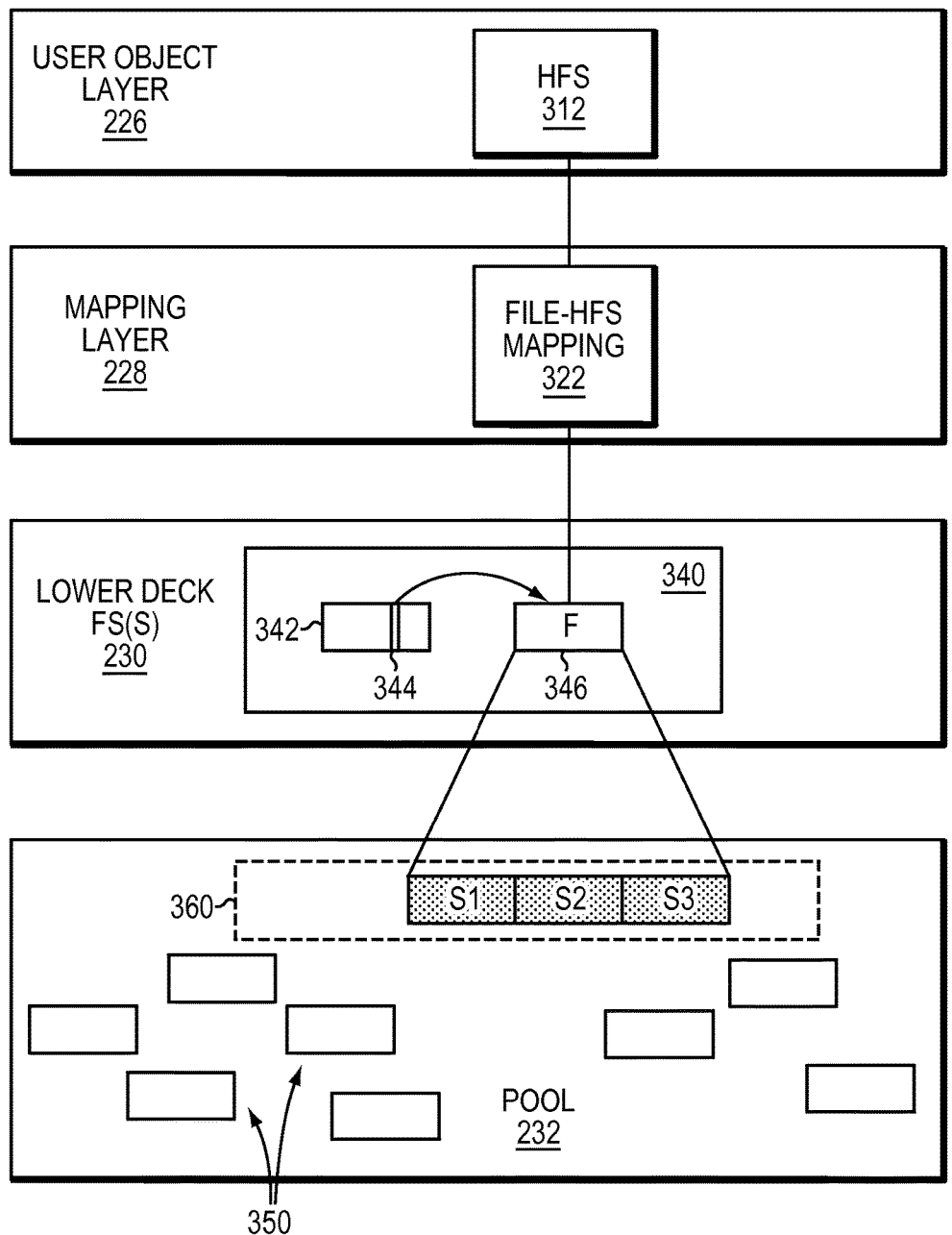
FIGS. 5-9 are diagrams illustrating in more detail components that may be used in connection with techniques herein.

FIG. 5 shows portions of the front end 142 in additional detail. Here, data objects include a LUN 310 and an HFS (host file system) 312. The object-volume mapping 224 includes a LUN-to-Volume mapping 320 and an HFS-to-Volume mapping 322. Using the approach described above, the LUN-to-Volume mapping 320 maps the LUN 310 to a first volume 324, and the HFS-to-Volume mapping 322 maps the HFS 312 to a second volume 326. The Volume-to-File mapping 228 maps the first and second internal volumes 324 and 328 to respective files 336 (F1) and 346 (F2) in respective lower-deck files systems 330 and 340. Through the various mappings, any set of blocks of the LUN 310 specified in an IO request 112 is mapped to a corresponding set of blocks within the first file 336. Similarly, any file or directory of the HFS 312 specified in an IO request 112 is mapped to a corresponding set of blocks within the second file 346.

The lower-deck file system 330 includes an inode table 332, and the lower-deck file system 340 includes an inode table 342. An inode 334 provides file-specific information about the first file 336, and an inode 344 provides file-specific information about the second file 346. The information stored in each inode includes location information (e.g., block locations) where data of the respective file are stored, and may thus be accessed as metadata to identify the locations of the file 346.

Although a single file is shown for the lower-deck file system 340, it is understood that each of the lower-deck file systems 230 may include any number of files, each having its own entry in the respective inode table of its file system. Also, a lower-deck file system may store not only regular files such as the file F 346, but also snapshots (point-in-time copies, also called "snaps") of such files. In this context the original file (e.g., file F 346) is referred to as a "primary" file. For instance, the lower-deck file system 340 stores the primary file 346 along with a different file for every snap of that file (such snaps effectively forming snaps of the HFS 312).

As shown, a set of slices 360 is allocated from the storage pool 232 for storing the file 346. In the example shown, slices S1 through S3 are used for storing the file 346, and thus the data that make up the HFS 312 are stored in the slices S1 through S3. In an example, the storage pool 232 allocates slices 350 to the set of file systems 230 in an on-demand manner, e.g., as the file 246 requires additional storage. The storage pool 232 can also deallocate slices from the set of file systems 230 when all the currently allocated slices are no longer required.

As described more below, at least some of the lower-deck file systems 230 are associated with respective volumes referred to as "sparse volumes". Sparse volumes provide an additional layer of mapping between the lower-deck file systems 230 and the pool 232 and allow the lower-deck file systems 230 to operate as file systems normally do, by accessing underlying volumes. Sparse volumes may also be employed at a higher level, between an HFS 312 and a file of a lower-deck file system 230 that is presented as a volume. Additional details about sparse volumes and their relation to lower-deck file systems may be found in U.S. Pat. No. 7,631,155, which is hereby incorporated by reference in its entirety. The incorporated patent uses the term "container file systems" to refer to constructs similar to the lower-deck file systems disclosed herein.

Figure 6:
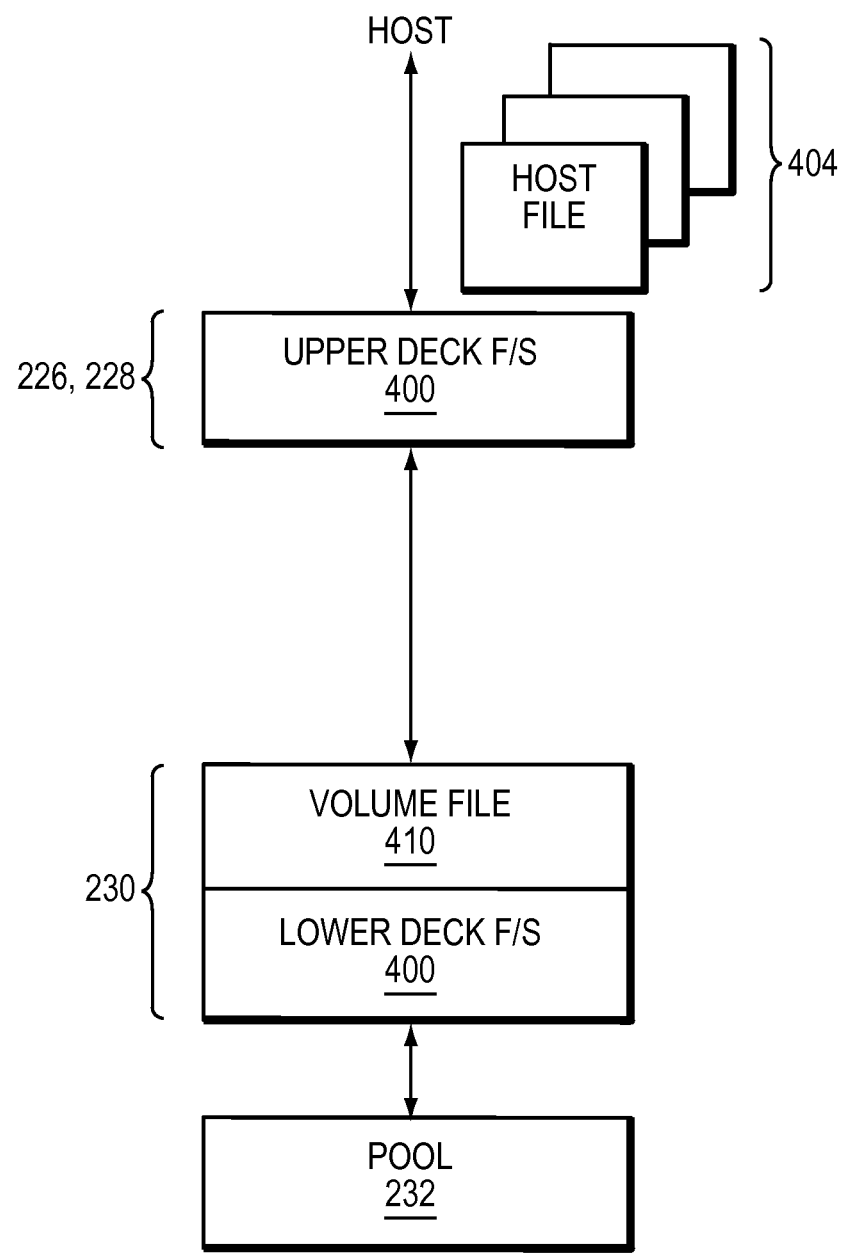

FIG. 6 shows another view of the organization of the data storage system useful for describing certain functionality as presented below. In FIG. 6, the user object and mapping layers 226, 228 include an upper-deck file system 400. As shown, the upper-deck file system 400 presents data in the form of host files 404 to a separate host computer (not shown). The lower-deck file system layer 230 includes a lower-deck file system 406. The lower-deck file system 406 presents a file referred to as a "volume file" 410 to the upper-deck file system 400.

Figure 7:
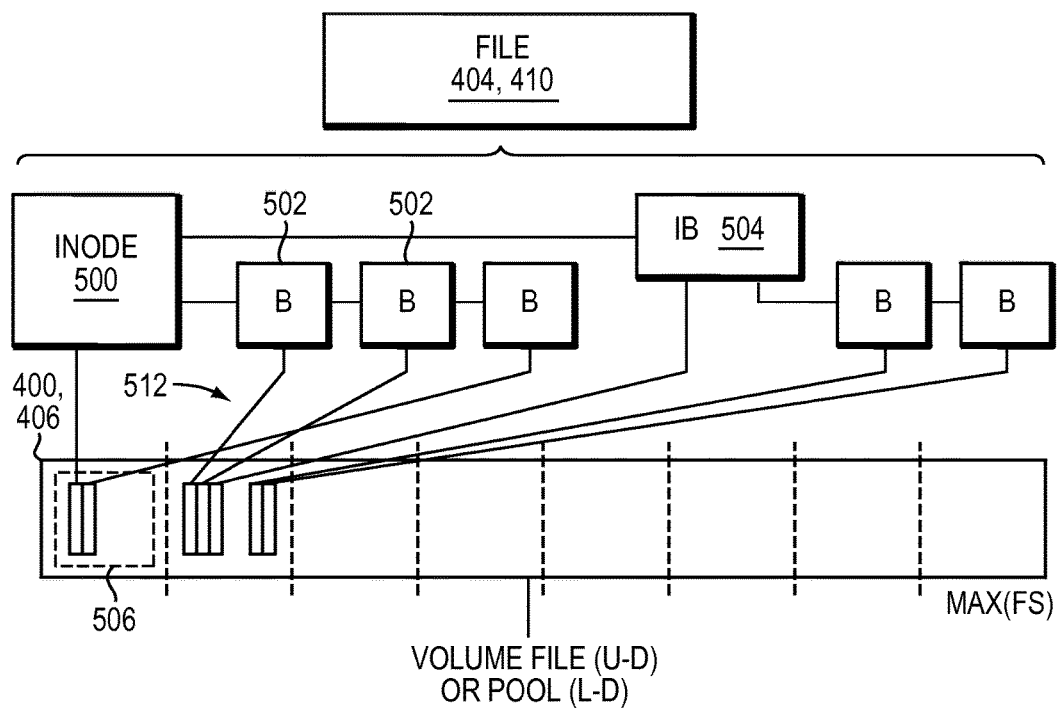

FIG. 7 illustrates certain details regarding files and file systems, applicable at both the upper layer (404, 400 in FIG. 6) and at the lower layer (410, 406) except for certain differences that are noted below. A file 404, 410 is shown as including an Inode 500 and a set of data blocks (B) 502. An indirect block (IB) 504 is also shown. All these items are included in the respective file system 400, 406, which in general will contain multiple files. Thus, the Inode 500 is part of an Inode structure 506 that includes Inodes of other files (not shown) as well as the indirect blocks 504. Additional details about the files 404, 410 and file systems 400, 406 are provided below.

Also shown in FIG. 7 is the relationship of the file 404, 410 to the respective file system. Each file system 400, 406 has a respective maximum size (as may be specified in blocks or bytes, for example) shown as Max(FS). At any given time there is an allocated size corresponding to the amount of underlying storage that is actually allocated for use.

The upper-deck file system 400 draws slices of storage from the volume file 410, while the lower-deck file system 406 draws slices directly from the pool 232. Of course, the volume file 410 is constituted by slices from the pool 232 via operation of the lower-deck file system 406. In many cases it will be desirable that slices defined at the upper level (upper-deck file system 400 and volume file 410) are of the same size, and aligned with, slices as defined in the pool 232 and used by the lower-deck file system 406. However, in general this is not required.

Returning to the files 404, 410, the Inode 500 contains direct pointers to some number of blocks 502 where file data is stored. If the file is sufficiently large, then one or more indirect blocks 504 are used. The Inode 500 contains pointers to the indirect block(s) 504, which in turn include pointers to additional data blocks 502. In typical file systems there may be at most three levels of indirection. In the description below, the term "IB tree" is used to refer to the entire set of IBs 504 and the Inode 500 for a given file.

The IB tree establishes a mapping 512 from a logical linear arrangement of blocks 502 of a file 404, 410 to corresponding block locations in the address space of the file system 400, 406. In general this mapping may be arbitrary, i.e., neither ordering nor adjacencies of blocks need to be preserved, and for such arbitrary mappings it is necessary to traverse the IB tree to locate a block in the file system 400, 406 based on an address of the block in the corresponding file 404, 410. This is the manner of operation of the upper-deck file system 400.

For the lower-deck file system 406, however, there is the possibility of operating in what is referred to as "direct mode" in which the mapping is constrained in a manner that enables block locations to be identified by calculation rather than by traversing the IB tree. Thus, in such a case, the block ordering is preserved, and block adjacencies are preserved within individual groups. In the simplified example of FIG. 7, this is shown for two groups, one having three blocks 502 and the other having two blocks 502. Calculation is generally much faster than IB tree traversal, and thus direct mode operation can provide improved file system performance.

In one embodiment, direct mode is a consequence of there being a single file in the file system 406. Rather than randomly allocating blocks to the file as it writes to them, a linear mapping is used that maps the first block in the file to the first data block in the file system, the second data block in the file to the second data block in the file system, and so on.

If there are no interspersed metadata structures, then the on disk location of any data block in a file can be simply the starting location of all data blocks in the file system plus the offset of the data block in the file. If the data blocks have metadata structures interspersed, the storage address can be algorithmically calculated given the file offset (the block in the file). The algorithm knows where the interspersed data structures are on disk so that it can correctly calculate the address of the data block on disk.

In another embodiment, a "mapped" mode of operation of a file system 400, 406, in which a logical linear arrangement of blocks 502 viewed as a linear file are mapped to generally arbitrary locations as viewed in the address space of the file system 400, 406. For the upper-deck file system 400, mapped operation is essentially inherent, and there is no other mode. For the lower-deck file system 406, however, mapped mode is one of potentially multiple distinct operating modes, possible due to the internal nature and specialized use of the lower-deck file system 406 in the data storage system. The remaining description focuses on mapped mode operation of the lower-deck file system 406 in particular.

In FIG. 7 the mapping is indicated by generally crossing lines 512 extending between the blocks 502 of a volume file 410 and their locations in the lower-deck file system 406. In mapped mode, the lower-deck file system 406 assigns blocks 502 to regions of its address space in a generally arbitrary manner, at least among groups of blocks 502 that are stored at different times. That is, blocks 502 are assigned to areas of physical storage as the blocks 502 are initially written, and in general a group of blocks 502 being written together will occupy sequential block areas. However, the blocks 502 of one file are generally interspersed with those of other files, and as files grow new areas of physical storage are allocated that are generally not contiguous with or sequentially ordered relative to existing areas where blocks 502 of the file are already stored.

With respect to the lower-deck file system 406 in particular, mapped mode operation implies a generally arbitrary relationship between blocks of the volume file 410 presented to the upper-deck file system 400 and the blocks as stored in the lower-deck file system 406. To satisfy an I/O request directed to a given block of the volume file 410 generally requires that the lower-deck file system 406 examine (or "traverse") the inode 500 and IB(s) 504 to identify the location of the block within the lower-deck file system 406. This represents a performance penalty, albeit one that is normally deemed acceptable when thin provisioning is used. The tradeoff is one of I/O latency and throughput versus storage efficiency, i.e., efficient use of available physical storage from the pool 232. As described below, in some embodiments a technique may be employed for transitioning a file system to a direct operating mode in which predetermined calculations can be used instead of Inode/IB traversals.

Figure 8:
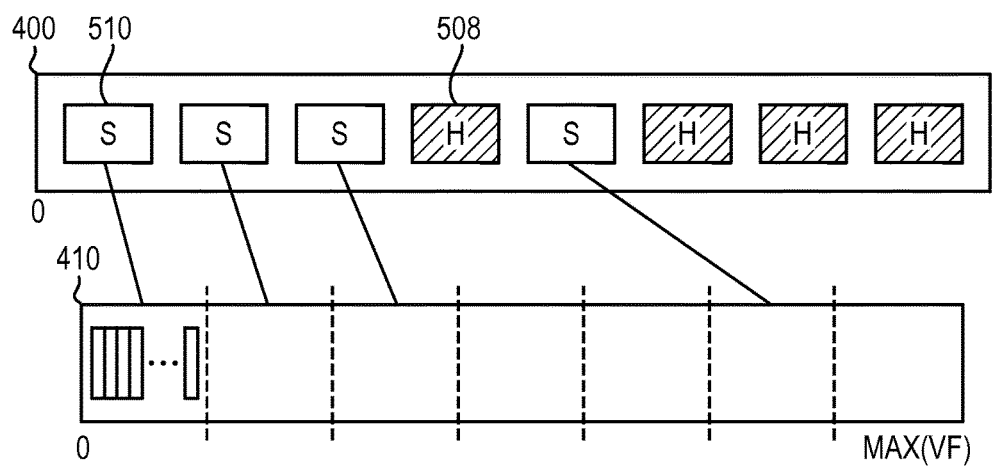

FIG. 8 illustrates the relationship between the upper-deck file system 400 and the volume file 410 presented by the lower-deck file system 406. Slices 510 are created from corresponding slice-size areas of the volume file 410, with a generally arbitrary mapping between their respective locations. Holes 508 are slice-size areas not currently provisioned. As the actual size of the upper-deck file system 400 increases, which is reflected in holes 508 being replaced with slices 510, the size of the volume file 410 is increased accordingly. This demand from the upper-deck file system 400 is passed down to the lower-deck file system 406, to which additional pool slices 350 are allocated to enable the lower-deck file system 406 to grow the size of the volume file 410 accordingly, and this additional space is used to add slices 510 to the upper-deck file system 400. As indicated, the volume file 410 has a maximum size shown as Max(VF). If demand by the upper-deck file system 400 surpasses this value, then subsequent file write operations from a host to the upper-deck file system 400 may be responded to with an out-of-space condition. In one embodiment, this may always occur. In another embodiment, this may be prevented by increasing Max(VF) and allocating additional storage from the pool 232 if available.

Slices 510 may be allocated, de-allocated, re-allocated, reserved, or redistributed by a slice manger. A slice may be, for example, a 1 GB slice of data. Further, a slice may be, for example, a 256 MB slice of data. However, the techniques described herein should not be construed as being limited to only slices of data; the techniques are equally applicable to other data chunk sizes, such as blocks, slivers (subset of slices), page, file or the like. The slice manager may be a software application or layer that is executed, at least in part, by one or more SPs. The slice manager may be responsible for implementing a slice allocation policy and/or algorithm. For example, the slice manager may receive slice allocation requests, and maintain relevant statistical information regarding slices by using a slice allocation table.

In at least one embodiment of the current technique, the mapping between block pointers of data blocks associated with I/O requests (e.g., read, write) and physical addresses may be arbitrary or even random. The data blocks are therefore likely to reside on different slices and certainly on different stripes of underlying RAID groups.

Implementations disclosed herein provide for improving the performance and efficiency of data access operations. To that end, it is desirable to avoid unnecessary reads or writes by cataloging and/or indexing more information related to storage and access of data. For example, Input/Output ("I/O") requests related to network servers, storage devices, etc., can be monitored. While monitoring I/O requests, prefetch algorithms can be used to predict sets of data blocks within associated storage devices that will be read from or written to in the future. In this respect, a cache memory is loaded with a data block or a set of data blocks identified by the prefetch algorithm. If the prefetch algorithm correctly identifies data blocks or sets of data blocks, then the data is already preloaded in the cache memory and available for use by a storage system.

Figure 9:
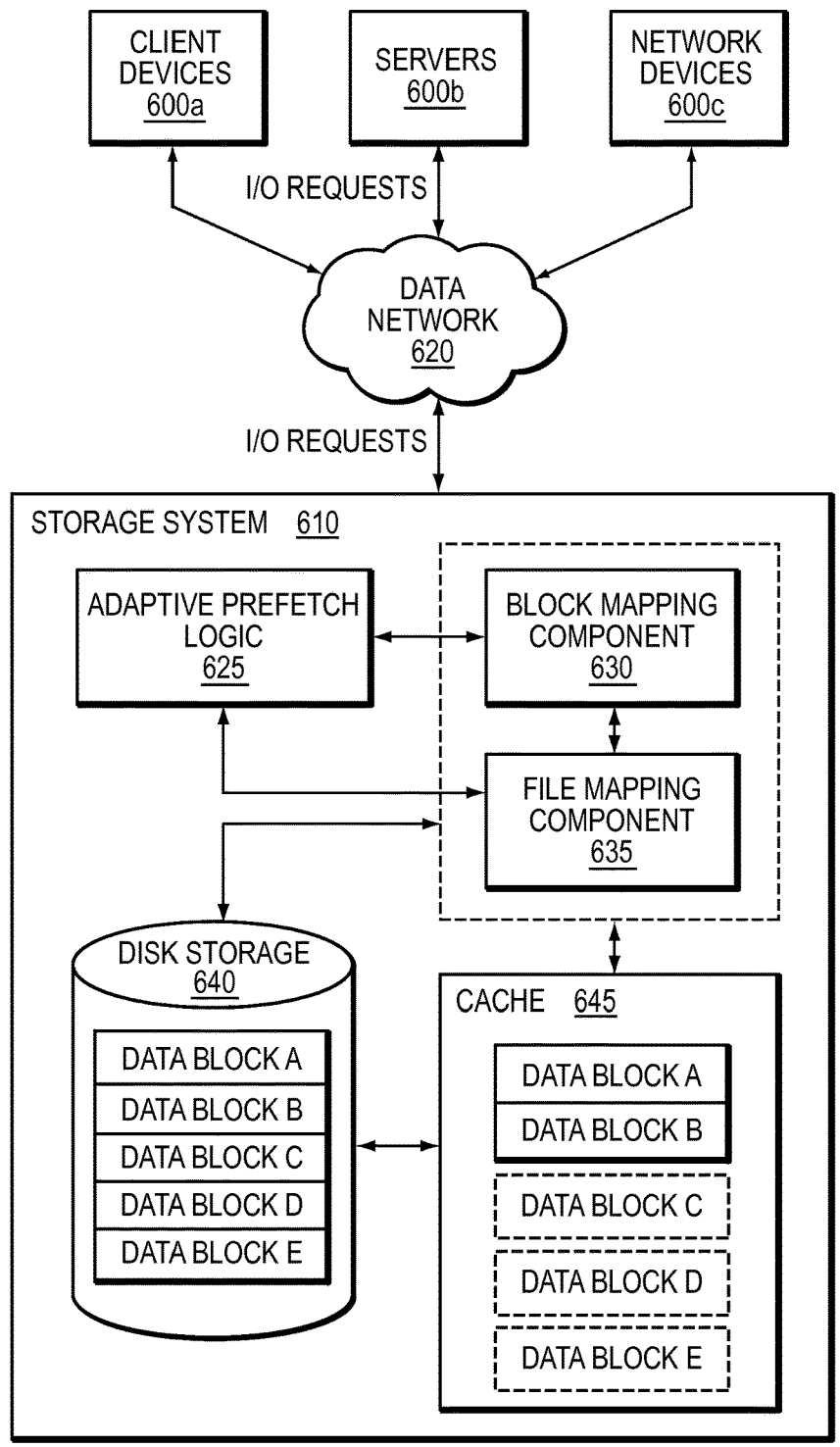

Referring to FIG. 9, shown is a more detailed representation of components that may be included in an embodiment using the techniques described herein. In at least one embodiment of the current technique, network device 600c can be a laptop computer, a desktop computer, a tablet, a smart phone, etc. Network device 600b can place I/O requests with data network 620 to access a file, a set of data blocks, a data access permission, etc. Data network 620 can be communicatively coupled with a storage system 610.

Data network 620 can determine a subset of I/O requests to forward to a storage system 610 as I/O requests. It can be appreciated that another subset of I/O requests can be targeted to other storage systems (not depicted), storage devices (not depicted), client devices (not depicted), etc. and can be routed to the appropriate device through data network 620.

A system, not depicted, as more fully described with respect to FIGS. 1-8, can reside within or be communicatively coupled to data network 620 or storage system 610. The system can monitor I/O requests, and through the application of a prefetch algorithm, along with the monitored data, determine potential future write requests or read requests. For example, one prefetch algorithm can be based of sequential access of data blocks. Through monitoring I/O requests, it can be determined that network device 600c is making sequential requests to access sequential ranges of a data within a file system. Continuing the example, disk device storage 640 includes Data Block A, Data Block B, Data Block C, Data Block D, and Data Block E corresponding to sequential ranges of offsets within the logical layout of a file system organized on disk storage 640.

Through monitoring I/O requests, it can be determined that Data Block A and Data Block B have been sequentially accessed for I/O requests. The prefetch algorithm then determines that offset ranges associated with Data Block C, Data Block D, and Data Block E are likely to be accessed next for I/O requests such as read operations.

When an unrelated read or write request is then received for an offset range outside Data Blocks A-E, at the time the unrelated request is performed, in parallel, data can be prefetched, e.g., read, from offset ranges for Data Blocks C-E and written to cache memory concurrently with executing the unrelated read or write request. After which, original data from Data Block C, Data Block D and Data Block E from the file system reside in cache memory to be processed by a storage system without requiring separate sequential read I/O from the file system.

It should be appreciated that data blocks may be prefetched piecemeal rather than in bulk as described in the preceding example. For example, after receiving I/O requests related to Data Block A and Data Block B, data Block D can be prefetched and loaded into Cache Memory 645 at the time Data Block C is requested as an I/O request by network device 600c. If Data Block D is then accessed via cache, Data Block E can be prefetched into cache memory 645 when performing an unrelated I/O, etc.

It can be also appreciated that prefetch algorithms are not exclusive to sequential reads/writes and can also be established to predict other disk storage activity. In addition, writes or reads need not be sequential for the prefetch algorithm to correctly predict a future write request or future read request. A pattern of reads or writes can be identified which predicts a future read or write based on the pattern continuing. For example, through a process of machine learning, prefetch algorithms can be refined for accuracy based on identifying previously requested or performed disk storage access patterns.

It can be further appreciated that the prefetch algorithm may not always accurately predict future disk storage activity. When the prefetch algorithm is accurate in predicting a future read, in accordance with implementations of this invention, original data from the read address will already be stored within cache for access by a data access process. It can be further appreciated that in the event the prefetch algorithm is inaccurate, the cache memory that stores the data related to a range where a subsequent read request is not received can be flushed from cache memory.

Referring back to FIG. 9, there is illustrated a high-level functional block diagram of an example system in accordance with implementations of this current technique. System 610 includes an adaptive prefetch logic 625 (also referred to herein as "predictive prefetch logic"), block mapping component 630, file mapping component 635, disk storage 640, cache memory 645 communicatively coupled to data network 620 or individual servers. It can be appreciated that through data network 620 or through direct connection, storage system 610 can communicate with client devices 600a, server 600b, or network devices 600c. Client devices 600a can include laptop computers, desktop computers, tablets, smart phones, e-readers, etc. Servers 600b can include storage servers, backup servers, data protection process servers, web servers, etc. Network devices 600c can include printers, storage devices, network access points, network infrastructure, etc. In one implementation, system 610 can reside within data network 620 and act as a network element capable of interacting and exchanging data with any device or server attached or communicatively coupled with data network 620. System 610 can also reside within a storage system, e.g., as a part of a storage controller. It can be appreciated that system 610 can include a processor capable of executing computer executable components. In one implementation, processors attached to storage system 610, e.g., storage processor, or data network 620 can be capable of executing computer executable components within system 610.

In at least one embodiment of the current technique, a storage system 610 may include a monitoring component that can monitor a set of I/O requests associated with a set of cache memory 645 and a set of storage devices 640. In the depicted example, storage system 610 includes cache memory 645 and storage devices 640.

In one implementation, a set of I/O requests can include associated metadata. For example, metadata associated with a read request can include file information such as a file name, a file type, a version, etc. In one implementation, metadata associated with I/O requests in the set of I/O requests includes at least one of a storage device location, a data block location, or a file system location. For example, if storage system 610 was monitoring a set of I/O requests associated with a large amount of storage devices, sets of I/O requests can be grouped or sorted based on those that share a common storage location, a common data block location, a common file system location, etc.

In at least one embodiment of the current technique, adaptive prefetch logic 625 can predict a future read request based on a set of I/O requests and a prefetch algorithm, wherein the future read request is associated with a first set of data blocks within a set of storage devices. It can be appreciated that the prefetch algorithm can be adjusted to predict read requests, write requests, or read and write requests.

In one implementation, the prefetch algorithm can be a learning algorithm that learns from past accurate and inaccurate predictions to make more accurate future predictions. It can be appreciated that the prefetch algorithm can identify varying patterns of disk storage access concurrently. For example, the prefetch algorithm can process I/O request data and predict sequential reads or writes along with patterned reads or writes outside of a sequential order. It can be appreciated that prefetch logic 625 can be stored within memory 645 for access by components. Further, file mapping component 635 and block mapping component 630 can each include respective adaptive prefetch logic for determining which data blocks to prefetch to process subsequent read and/or write requests. In one implementation, adaptive prefetch logic 625 dynamically predicts which set of data blocks may have a high probability of being accessed by future read requests. As a result, the set of data blocks identified by adaptive prefetch logic 625 are read from storage device 640 into cache 645. Further, for example, disk storage 640 can send the prefetched data blocks residing within cache memory 645 to a client (e.g., client devices 600*a*, server 600*b*, network device 600*c* that may require contents of the data blocks for performing I/O requests.

Thus, in at least one embodiment of the current technique, respective adaptive prefetch logic used by file mapping and block mapping components provide information to each other to improve its respective predictive prefetch techniques for prefetching data that has a high probability of being accessed by future I/O requests.

Figure 10:
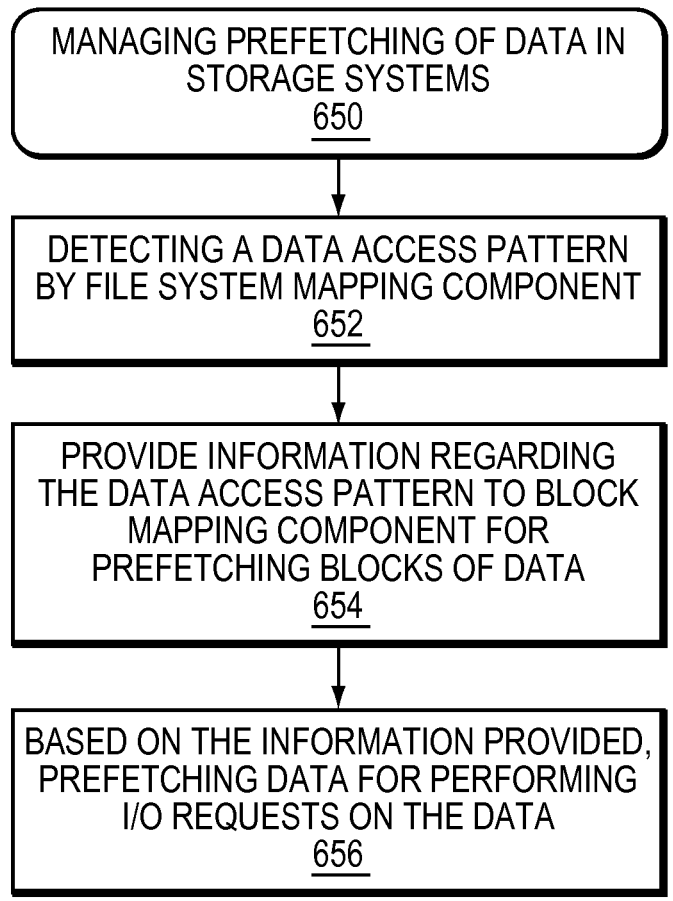
FIG. 10 is a flow diagram illustrating processes that may be used in connection with techniques herein.

Referring to FIG. 10, shown is a detailed flow diagram illustrating managing prefetching of data in storage systems. In at least one embodiment of the current technique, a set of I/O requests is received by a storage system. The set of I/O requests may be directed to a specific location of an object such as a logical volume or a file system. A file mapping component detects a data access pattern (e.g. requests to access data blocks organized in a sequential manner) (step 652). A data access pattern may be detected upon processing a set of I/O requests and based on historical information stored regarding I/O requests processed in the past. The file mapping component provides information regarding the data access pattern identified by the file mapping component to a block mapping component (step 654). The block mapping component may use the information provided by file mapping component to improve heuristics related to data access pattern identified by predictive prefetch techniques used by the block mapping component. The information provided by the file mapping component may include a list of data blocks or a list of mappings to the data blocks associated with the data access pattern identified by the file mapping component. Based on the information provided by the file mapping component, the block mapping component prefetch data into a cache of a storage system such that future I/O requests may be processed efficiently without having to read data from a storage device (step 656).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing prefetching of data in storage systems, the method comprising:

determining, by a file system mapping component of a storage system, a data access pattern for prefetching data in a cache of the storage system for performing subsequent I/O requests on the data, wherein the data access pattern is determined based on a set of I/O requests previously processed by the storage system, wherein a type of the data access pattern includes a sequential access pattern indicating that data is accessed in a sequential manner;

providing, by the file system mapping component, information associated with the type of the data access pattern determined by the file system mapping component and a list of data blocks determined for prefetching in the cache to a block mapping component of the storage system, wherein the file mapping component provides file services to a client of the storage system by presenting a storage volume managed by the block mapping component and organized on a storage device included in the storage system as a file system to the client of the storage system and the block mapping component provides block services to the client of the storage system using a respective prefetching process adaptive to the type of data access pattern identified by the file system mapping component; and managing, by the block mapping component, the prefetching of data from the storage device to the cache for performing the subsequent I/O requests, wherein the block system mapping component uses the information regarding the type of data access pattern and the list of data block provided by the file system mapping component for prefetching respective data blocks in the list of data blocks having a high probability of being accessed by the subsequent I/O requests from the storage device of the storage system.

2. The method of claim 1, wherein the information associated with the determination of the data access pattern includes a list of mapping pointers to the data blocks determined for prefetching in the cache by the file system mapping component.

3. The method of claim 1, wherein the data blocks pre-fetched by the block mapping component are stored in the cache of the storage system.

4. The method of claim 1, wherein an I/O request includes a request to read data of the file system.

5. The method of claim 1, wherein the block mapping component manages the prefetching of the data blocks from the storage device by combining the information received from the file system mapping component with prefetching techniques used by the block mapping component.

6. The method of claim 1, wherein the file system mapping component manages the file system, wherein the file system includes a set of files, each file associated with an inode, wherein the inode of each file includes metadata of the file, wherein the file system is associated with a set of sparse volumes, wherein a sparse volume includes a set of slices, each slice of the set of slices is a logical representation of a subset of physical disk storage.

7. The method of claim 6, wherein the file system resides on the storage system, wherein the storage system includes a disk drive system comprising a plurality of Redundant Array of Inexpensive Disks (RAID) systems, each RAID system of the plurality of RAID systems having a first disk drive and a second disk drive.

8. The method of claim 6, wherein the file system is an upper deck file system, and further including operating a lower deck file system providing a volume file used by the upper deck file system for file storage, and wherein obtaining an extent of physical storage from a storage pool and adding it to the file system includes the lower deck file system adding the extent of physical storage to the volume file.

9. The method of claim 8, wherein the lower deck file system adds the extent of physical storage to the volume file incrementally over the subsequent period as the subsequent I/O requests are received requiring underlying physical storage.

10. A system for use in managing prefetching of data in storage systems, the system comprising a processor implemented at least partially by hardware and configured to:

determine, by a file system mapping component of a storage system, a data access pattern for prefetching data in a cache of the storage system for performing subsequent I/O requests on the data, wherein the data access pattern is determined based on a set of I/O requests previously processed by the storage system, wherein t a type of the data access pattern includes a sequential access pattern indicating that data is accessed in a sequential manner;

provide, by the file system mapping component, information associated with the type of data access pattern determined by the file system mapping component and a list of data blocks determined for prefetching in the cache to a block mapping component of the storage system, wherein the file mapping component provides file services to a client of the storage system by presenting a storage volume managed by the block mapping component and organized on a storage device included in the storage system as a file system to the client of the storage system and the block mapping component provides block services to the client of the storage system using a respective prefetching process adaptive to the type of data access pattern identified by the file system mapping component; and manage, by the block mapping component, the prefetching of data from the storage device to the cache for performing the subsequent I/O requests, wherein the block system mapping component uses the information regarding the type of data access pattern and the list of data block provided by the file system mapping component for prefetching respective data blocks in the list of data blocks having a high probability of being accessed by the subsequent I/O requests from the storage device of the storage system.

11. The system of claim 10, wherein the information associated with the determination of the data access pattern includes a list of mapping pointers to the data blocks determined for prefetching in the cache by the file system mapping component.

12. The system of claim 10, wherein the data blocks pre-fetched by the block mapping component are stored in the cache of the storage system.

13. The system of claim 10, wherein an I/O request includes a request to read data of the file system.

14. The system of claim 10, wherein the block mapping component manages the prefetching of the data blocks from the storage device by combining the information received from the file system mapping component with prefetching techniques used by the block mapping component.

15. The system of claim 10, wherein the file system mapping component manages the file system, wherein the file system includes a set of files, each file associated with an inode, wherein the inode of each file includes metadata of the file, wherein the file system is associated with a set of sparse volumes, wherein a sparse volume includes a set of slices, each slice of the set of slices is a logical representation of a subset of physical disk storage.

16. The system of claim 15, wherein the file system resides on the storage system, wherein the storage system includes a disk drive system comprising a plurality of Redundant Array of Inexpensive Disks (RAID) systems, each RAID system of the plurality of RAID systems having a first disk drive and a second disk drive.

17. The system of claim 15, wherein the file system is an upper deck file system, and further including operating a lower deck file system providing a volume file used by the upper deck file system for file storage, and wherein obtaining an extent of physical storage from a storage pool and adding it to the file system includes the lower deck file system adding the extent of physical storage to the volume file.

18. The system of claim 17, wherein the lower deck file system adds the extent of physical storage to the volume file incrementally over the subsequent period as the subsequent I/O requests are received requiring underlying physical storage.

* * * * *